United States Patent
Srinivasaiah

(10) Patent No.: US 10,191,844 B2
(45) Date of Patent: Jan. 29, 2019

(54) AUTOMATIC GARBAGE COLLECTION THRASHING MONITORING

(71) Applicant: AppDynamics LLC, San Francisco, CA (US)

(72) Inventor: Vinay Srinivasaiah, San Carlos, CA (US)

(73) Assignee: Cisco Technology, Inc., San Jose, CA (US)

( * ) Notice: Subject to any disclaimer, the term of this patent is extended or adjusted under 35 U.S.C. 154(b) by 426 days.

(21) Appl. No.: 14/699,372

(22) Filed: Apr. 29, 2015

(65) Prior Publication Data

US 2016/0321173 A1 Nov. 3, 2016

(51) Int. Cl.
 *G06F 17/30* (2006.01)
 *G06F 12/02* (2006.01)
 *G06F 11/30* (2006.01)

(52) U.S. Cl.
 CPC ...... *G06F 12/0261* (2013.01); *G06F 11/3006* (2013.01); *G06F 11/3079* (2013.01); *G06F 2212/702* (2013.01)

(58) Field of Classification Search
 CPC .............. G06F 12/0253; G06F 12/0261; G06F 11/3006; G06F 11/3079; G06F 2212/702
 USPC ........................................ 707/813, 814, 815
 See application file for complete search history.

(56) References Cited

U.S. PATENT DOCUMENTS

| | | | | |
|---|---|---|---|---|
| 7,313,661 | B1* | 12/2007 | Dmitriev | G06F 12/0253 711/159 |
| 8,793,289 | B2* | 7/2014 | Topchiyski | G06F 11/0709 707/813 |
| 8,892,610 | B1* | 11/2014 | Pang | G06F 12/0253 707/813 |
| 2007/0255773 | A1* | 11/2007 | Simeonov | G06F 11/0709 |
| 2010/0242025 | A1* | 9/2010 | Yamazaki | G06F 11/3476 717/127 |
| 2016/0070633 | A1* | 3/2016 | Abraham | G06F 11/3612 714/47.3 |

* cited by examiner

*Primary Examiner* — Hares Jami
(74) *Attorney, Agent, or Firm* — Parker Ibrahim & Berg LLP; James M. Behmke; Stephen D. LeBarron

(57) ABSTRACT

The system identifies objects that cause thrashing behavior in garbage collection. A garbage collection process may be monitored for a period of time. Over that period of time, a number of objects may be observed to be collected by the garbage collection process. Data may be collected for those objects and a subset of those objects may be determined to be suspicious based on data collected for each object. The suspicious objects may then be reported as causing garbage collection thrashing.

27 Claims, 8 Drawing Sheets

AUTOMATIC GARBAGE COLLECTION THRASHING MONITORING

BACKGROUND

The World Wide Web has expanded to provide web services faster to consumers. Web services may be provided by a web application which uses one or more services to handle a transaction. The applications may be distributed over several machines, making the topology of the machines that provides the service more difficult to track and monitor.

Monitoring a web application helps to provide insight regarding bottle necks in communication, communication failures and other information regarding performance of the services that provide the web application. Most application monitoring tools provide a standard report regarding application performance. Though the typical report may be helpful for most users, it may not provide the particular information that an administrator wants to know.

For example, typical reports do not provide detailed information for garbage collection and the causes for garbage collection thrashing. Garbage collection thrashing is undesirable because the process stops operation of an application, which in turn leads to unavailable servers and other undesirable effects.

There is a need in the art for improved application performance reporting that considers garbage collection.

SUMMARY

The present technology identifies objects that cause thrashing behavior in garbage collection. A garbage collection process may be monitored for a period of time. Over that period of time, a number of objects may be observed to be collected by the garbage collection process. Data may be collected for those objects and a subset of those objects may be determined to be suspicious based on data collected for each object. The suspicious objects may then be reported as causing garbage collection thrashing.

Collecting data may include identifying a predictable period. For a garbage collection process, click collecting data at intervals within a period of the process, and collecting data for each interval. The data may include stack trace data, a data dump, and other data that determines the number of objects created as well as the size of the objects. Once data is known for the objects, a memory usage associated with each object is compared to garbage collection thrashing. The best matching object memory usage is investigated to determine the source of the particular object. The source of the objects that best match the garbage collection thrashing are provided as the source of the garbage collection thrashing.

A method for monitoring a garbage collection process includes monitoring a garbage collection process for a period of time. Data is collected for objects that are handled by the garbage collection process. A sub-set of the handled objects are identified by the agent that are suspicious based on the collected data. The source of suspicious objects is reported to user.

An embodiment may include a system for reporting data. The system may include a processor, memory, and one or more modules stored in memory and executable by the processor. When executed, the modules may monitor a garbage collection process associated with an application by an agent executing on a server for a period of time, collect data for objects that are handled by the garbage collection process, identify a sub-set of the handled objects by the agent that are suspicious based on the collected data, and report source of suspicious objects to user.

BRIEF DESCRIPTION OF THE DRAWINGS

FIG. 7 provides a block diagram for a mobile device.

DETAILED DESCRIPTION

The present technology identifies objects that cause thrashing behavior in garbage collection. A garbage collection process may be monitored for a period of time. Over that period of time, a number of objects may be observed to be collected by the garbage collection process. Data may be collected for those objects and a subset of those objects may be determined to be suspicious based on data collected for each object. The suspicious objects may then be reported as causing garbage collection thrashing. Collecting data may include identifying a predictable. For a garbage collection process, click collecting data at intervals within a. Of the process, and collecting data for each interval. The data may include stack trace data, a data dump, and other data that determines the number of objects created as well as the size of the objects. Once data is known for the objects, a memory usage associated with each object is compared to garbage collection thrashing. The best matching object memory usage is investigated to determine the source of the particular object. The source of the objects that best match the garbage collection thrashing are provided as the source of the garbage collection thrashing.

Figure 1:
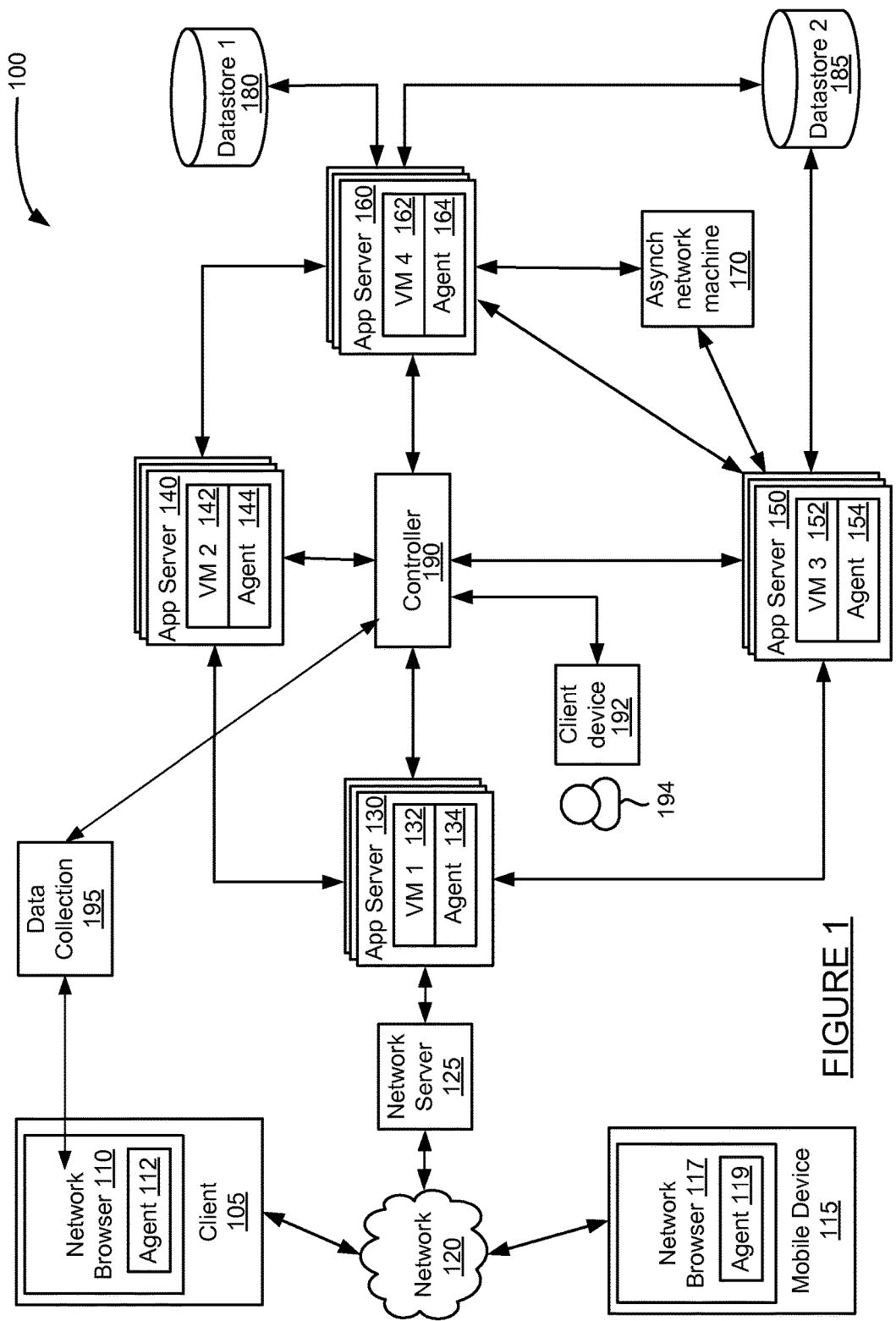
FIG. 1 illustrates a block diagram of a system for determining the source of garbage collection thrashing for an application.

FIG. 1 provides a block diagram of a system for monitoring and reporting page composition data for a distributed transaction. System 100 of FIG. 1 includes client device 105 and 192, mobile device 115, network 120, network server 125, application servers 130, 140, 150 and 160, asynchronous network machine 170, data stores 180 and 185, controller 190, and data collection server 195.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120.

Network browser 110 may include agent 112. Agent 112 may be installed on network browser 110 and/or client 105 as a network browser add-on, downloading the application to the server, or in some other manner. Agent 112 may be executed to monitor network browser 110, the operation system of client 105, and any other application, API, or other component of client 105. Agent 112 may determine network browser navigation timing metrics, access browser cookies, monitor code, and transmit data to data collection 160, controller 190, or another device. Agent 112 may perform other operations related to monitoring a request at client 105 as discussed herein.

Mobile device 115 is connected to network 120 and may be implemented as a portable device suitable for sending and receiving content over a network, such as for example a mobile phone, smart phone, tablet computer, or other portable device. Both client device 105 and mobile device 115 may include hardware and/or software configured to access a web service provided by network server 125.

Mobile device 115 may include network browser 117 and an agent 119. Agent 119 may reside in and/or communicate with network browser 117, as well as communicate with other applications, an operating system, APIs and other hardware and software on mobile device 115. Agent 119 may have similar functionality as that described herein for agent 112 on client 105, and may repot data to data collection server 160 and/or controller 190.

Network 120 may facilitate communication of data between different servers, devices and machines of system 100 (some connections shown with lines to network 120, some not shown). The network may be implemented as a private network, public network, intranet, the Internet, a cellular network, Wi-Fi network, VoIP network, or a combination of one or more of these networks.

Network server 125 is connected to network 120 and may receive and process requests received over network 120. Network server 125 may be implemented as one or more servers implementing a network service, and may be implemented on the same machine as application server 130. When network 120 is the Internet, network server 125 may be implemented as a web server. Network server 125 and application server 130 may be implemented on separate or the same server or machine Application server 130 communicates with network server 125, application servers 140 and 150, controller 190. Application server 130 may also communicate with other machines and devices (not illustrated in FIG. 1). Application server 130 may host an application or portions of a distributed application and include a virtual machine 132, agent 134, and other software modules. Application server 130 may be implemented as one server or multiple servers as illustrated in FIG. 1.

Virtual machine 132 may be implemented by code running on one or more application servers. The code may implement computer programs, modules and data structures to implement a virtual machine mode for executing programs and applications. In some embodiments, more than one virtual machine 132 may execute on an application server 130. A virtual machine may be implemented as a Java Virtual Machine (JVM). Virtual machine 132 may perform all or a portion of a business transaction performed by application servers comprising system 100. A virtual machine may be considered one of several services that implement a web service.

Virtual machine 132 may be instrumented using byte code insertion, or byte code instrumentation, to modify the object code of the virtual machine. The instrumented object code may include code used to detect calls received by virtual machine 132, calls sent by virtual machine 132, and communicate with agent 134 during execution of an application on virtual machine 132.

In some embodiments, server 130 may include applications and/or code other than a virtual machine. For example, server 130 may include Java code, .NET code, PHP code, Ruby code, or other code to implement applications and process requests received from a remote source.

Agent 134 on application server 130 may be installed, downloaded, embedded, or otherwise provided on application server 130. For example, agent 134 may be provided in server 130 by instrumentation of object code, downloading the application to the server, or in some other manner. Agent 134 may be executed to monitor application server 130, monitor code running in a or a virtual machine 132 (or other program, such as a PHP program), and communicate with byte instrumented code on application server 130, virtual machine 132 or another application on application server 130. Agent 134 may detect operations such as receiving calls and sending requests by application server 130 and virtual machine 132. Agent 134 may receive data, for example from instrumented code of the virtual machine 132, and process the data and transmit the data to controller 190. Agent 134 may perform other operations related to monitoring virtual machine 132 and application server 130 as discussed herein. For example, agent 134 may identify other applications, share business transaction data, aggregate detected runtime data, and other operations.

An agent may operate to monitor a node, tier or nodes or other entity. A node may be a software program or a hardware component (memory, processor, and so on). A tier of nodes may include a plurality of nodes which may process a similar business transaction, may be located on the same server, may be associated with each other in some other way, or may not be associated with each other.

Agent 134 may create a request identifier for a request received by server 130 (for example, a request received by a client 105 or 115 associated with a user or another source). The request identifier may be sent to client 105 or mobile device 115, whichever device sent the request. In embodiments, the request identifier may be created when a data is collected and analyzed for a particular business transaction. Additional information regarding collecting data for analysis is discussed in U.S. patent application Ser. No. 12/878,919, titled "Monitoring Distributed Web Application Transactions," filed on Sep. 9, 2010, U.S. patent application Ser. No. 13/189,360, titled "Automatic Capture of Diagnostic Data Based on Transaction Behavior Learning," filed on Jul. 22, 2011, and U.S. patent application Ser. No. 13/365,171, titled "Automatic Capture of Detailed Analysis Information for Web Application Outliers with Very Low Overhead," filed on Feb. 2, 2012, the disclosures of which are incorporated herein by reference.

Each of application servers 140, 150 and 160 may include an application and an agent. Each application may run on the corresponding application server or a virtual machine. Each of virtual machines 142, 152 and 162 on application servers 140-160 may operate similarly to virtual machine 132 and host one or more applications which perform at least a portion of a distributed business transaction. Agents 144, 154 and 164 may monitor the virtual machines 142-162, collect and process data at runtime of the virtual machines, and communicate with controller 190. The virtual machines 132, 142, 152 and 162 may communicate with each other as part of performing a distributed transaction. In particular each virtual machine may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. In some embodiments, controller 190 may receive runtime data, including data associated with monitoring client requests at client 105 and mobile device 115, from data collection server 160. In some embodiments, controller 190 may receive runtime data from each of agents 112, 119, 134, 144 and 154. Controller 190 may associate portions of business transaction data, communicate with agents to configure collection of runtime data, and provide performance data and reporting through an interface. The interface may be viewed as a web-based interface viewable by client device 192, which may be a mobile device, client device, or any other platform for viewing an interface provided by controller 190. In some embodiments, a client device 192 may directly communicate with controller 190 to view an interface for monitoring data.

Client device 192 may include any computing device, including a mobile device or a client computer such as a desktop, work station or other computing device. Client computer 192 may communicate with controller 190 to create and view a custom interface. In some embodiments, controller 190 provides an interface for creating and viewing the custom interface as content page, e.g. a web page, which may be provided to and rendered through a network browser application on client device 192.

Figure 2:
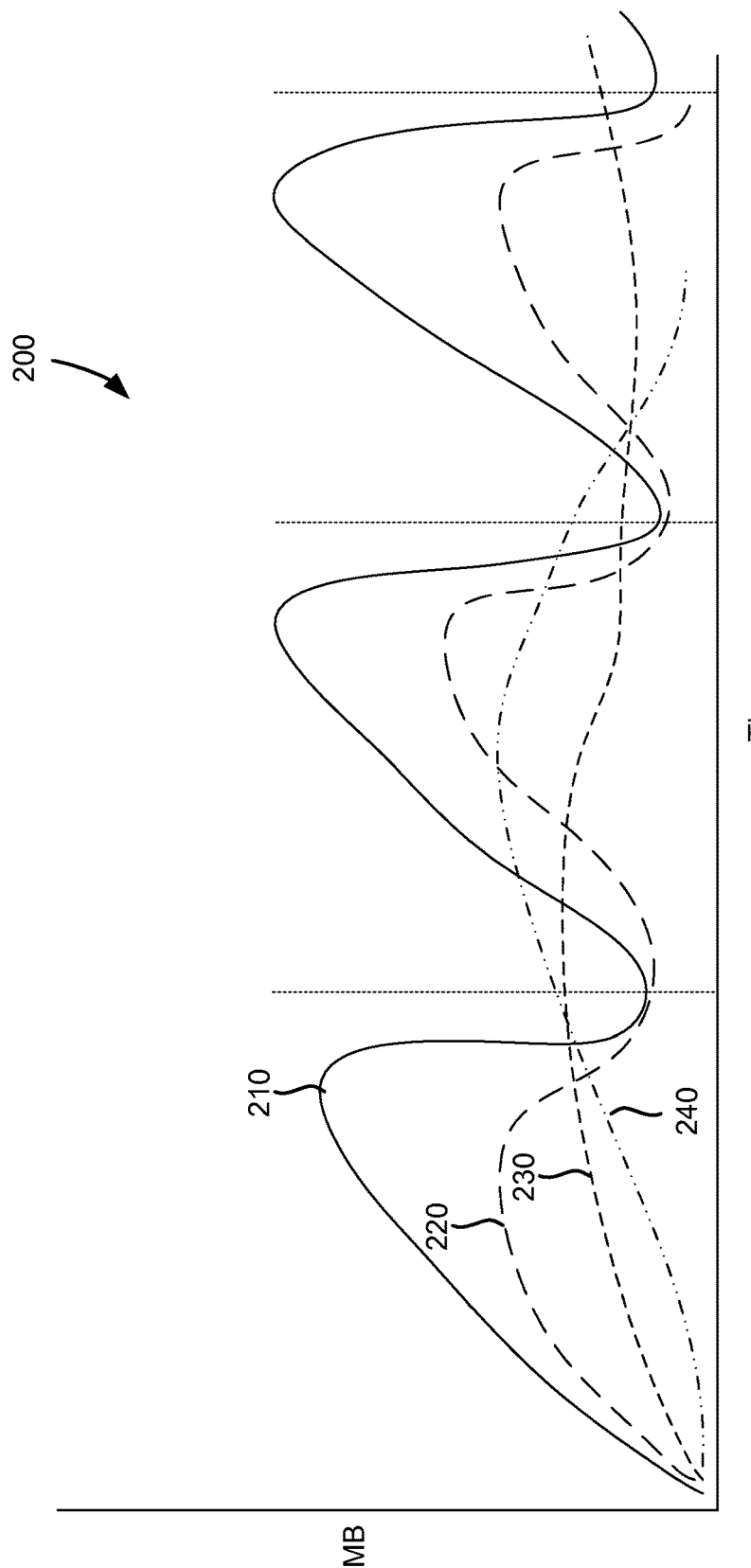
FIG. 2 provides a graph of garbage collection thrashing along with memory usages.

FIG. 2 provides a graph of garbage collection memory usage with individual object memory usage. As shown in the graph of FIG. 2, the memory usage 210 for the garbage collection process steadily increases to a certain point and then rapidly falls, and repeats this cycle three times in the illustrated range. The rapid decrease in memory usage for the garbage collection process represents the time the garbage is collected. When the garbage is collected, all processes on the application server are temporarily stopped while the garbage collection process takes place. After the garbage collection process cleans out memory, the garbage collection memory usage again rises, as can be seen in the second interval of the graph. This general pattern continues for three garbage collection cycles.

In addition to the garbage collection memory usage, the memory usage of three objects are also illustrated over the same time period. Object A has a memory usage illustrated as line 220. As can be seen in the graph of FIG. 2, the memory usage for object A rises and falls roughly with the same boundaries of the garbage collection memory usage. Object B memory usage is represented by dashed line 230. The memory usage 230 gradually increases over a time period of 1.5 garbage collection cycles and then decreases over the next 1.5 cycles of the garbage collection. Object C has a memory usage shown by line 240. Line 240 also shows a gradual increase followed by a gradual decrease over the three cycles of the garbage collection process.

Figure 3:
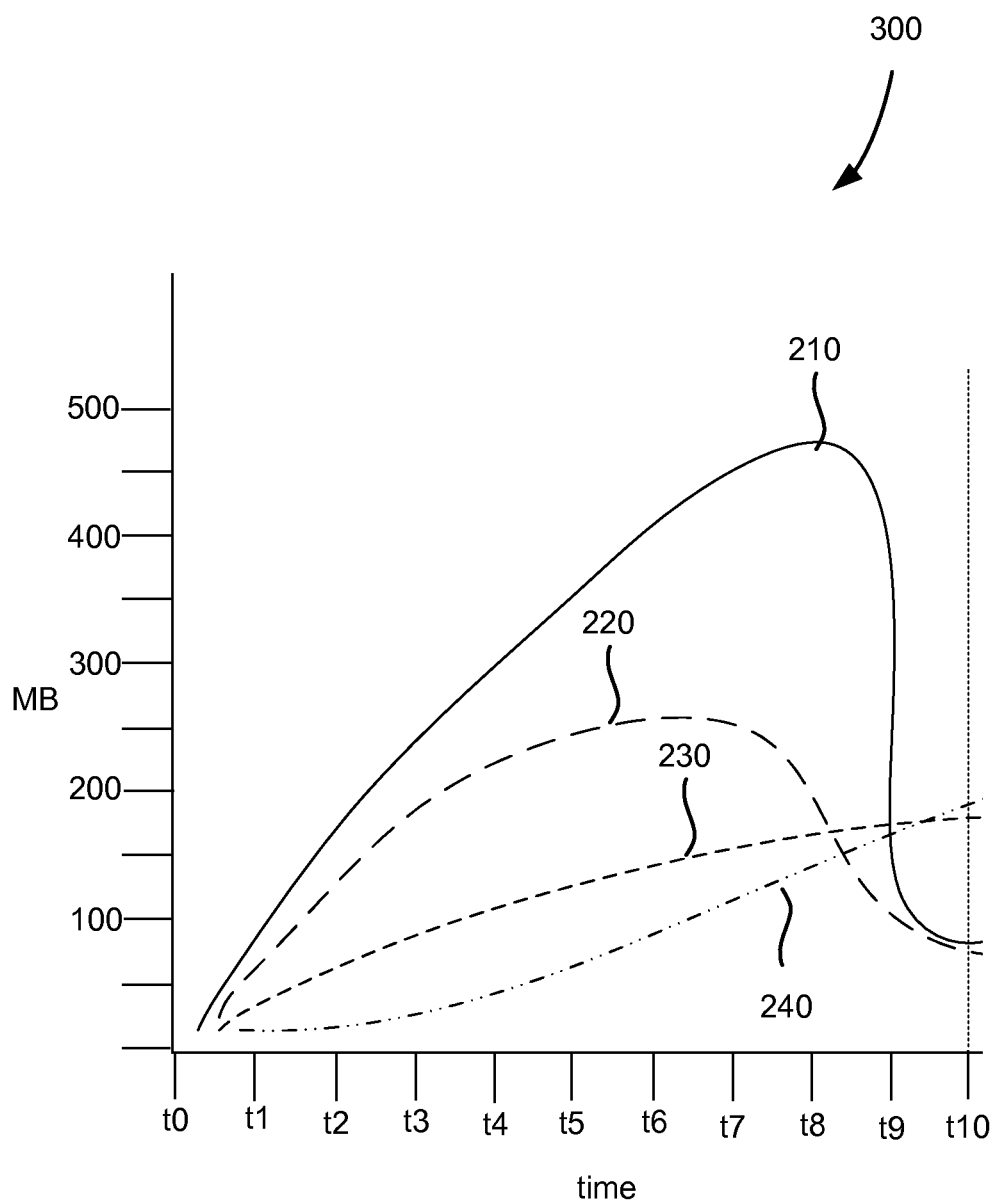
FIG. 3 provides a graph of a single. Of garbage collection and object memory usages.

FIG. 3 illustrates a graph of garbage collection and object memory usage over a single garbage collection cycle. The garbage collection cycle may be divided into a number of time sections. In FIG. 3, the sections are marked as T0 through T10. In some instances, a data dump may be taken at each time section. Each data dump may collect information for memory usage of the garbage collection memory and each object. Information in the data dump may include the average memory size of the object as well as the number of objects instantiated for the particular object at the particular time.

Figure 4:
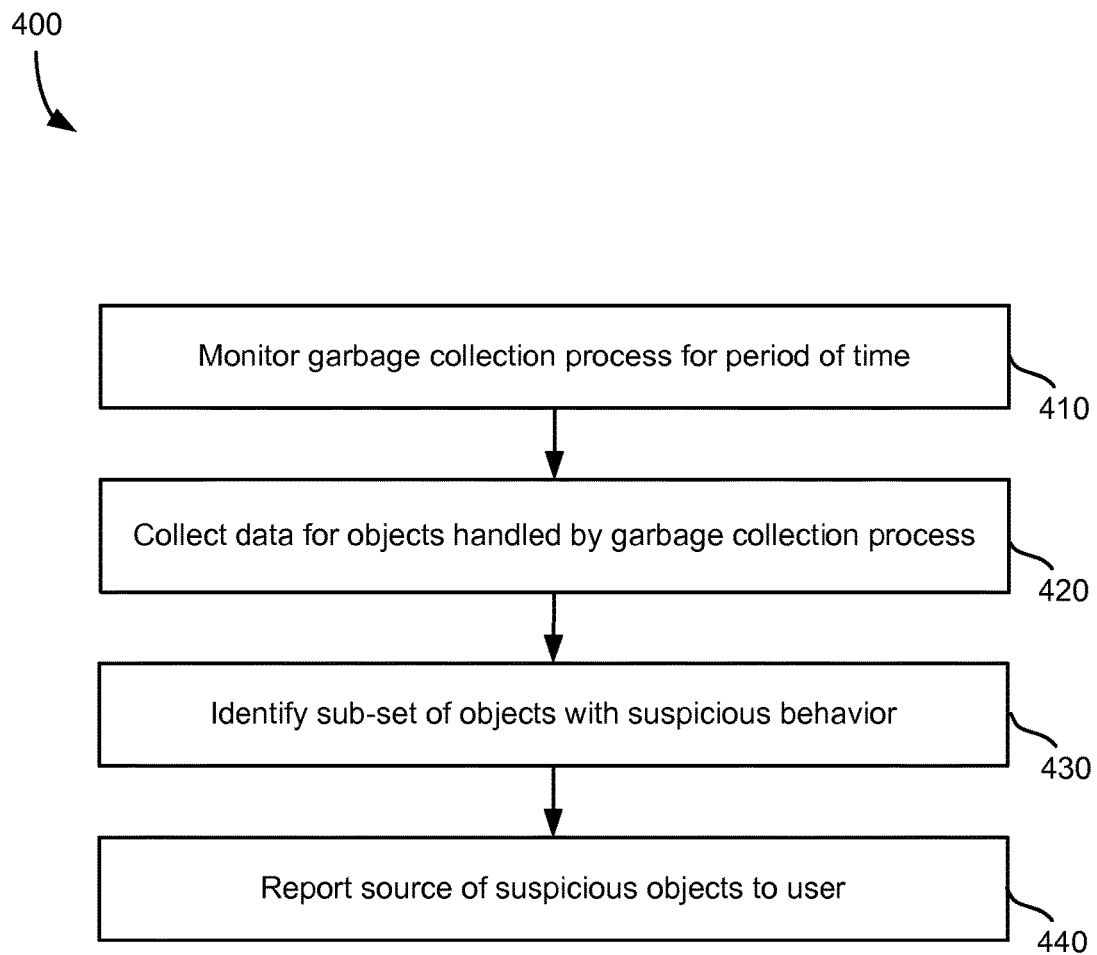
FIG. 4 illustrates a method for detecting garbage collection thrashing.

FIG. 4 illustrates a method for detecting garbage collection thrashing. First, a garbage collection process may be monitored for a period of time at step 410. The period of time may be any period that allows for several cycles of garbage collection to occur. In some instances, a predictable cycle may be determined for the garbage collection process based on the several viewed garbage collection cycles.

Data for objects handled by the garbage collection process is collected at step 420. The data may be collected at different times during the garbage collection cycle. The data may include stack tracing, the memory for a particular object in the garbage collection process, the number of objects instantiated, and other data. Collecting data for objects handled by the garbage collection process is discussed in more detail with respect to the method of FIG. 5.

Suspicious objects are identified at step 430. The suspicious objects may be those associated with memory usage that most closely resembles the thrashing memory usage of the garbage collection process. More details for determining suspicious objects are discussed with respect to the method of FIG. 6. A source of garbage collection thrashing may be reported at step 440. The source may be reported as one or more objects whose creation likely creates undesirable thrashing of the garbage collector. More details for reporting the source of garbage collection thrashing is discussed with respect to the method of FIG. 7.

Figure 5:
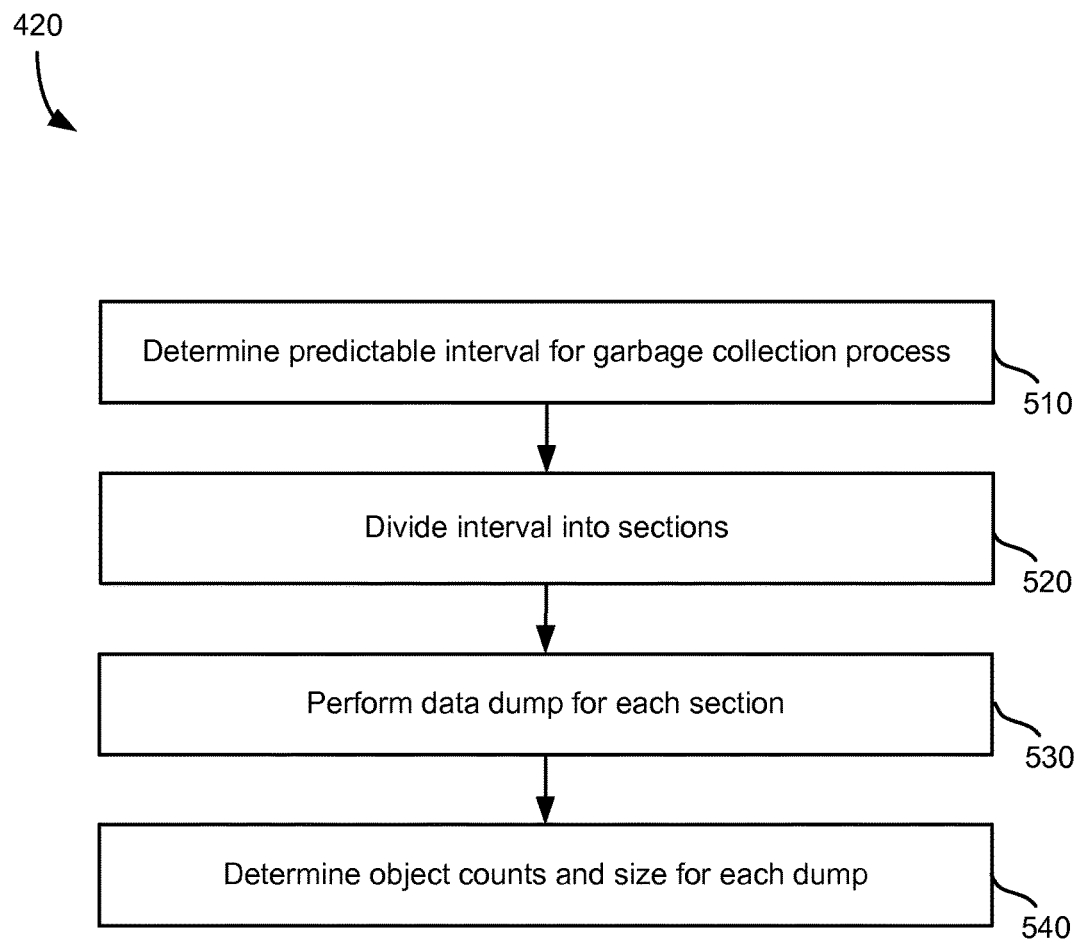
FIG. 5 illustrates a method for collecting object data.

FIG. 5 illustrate a method for collecting object data. The method of FIG. 5 provides more detail for step 420 the method of FIG. 4. First, a predictable cycle time for a garbage collection process is determined at step 510. The predictable cycle is determined after monitoring the garbage collection process for a period of time that includes one or more cycles for the garbage collection process. The predictable cycle is determined based on the average time of the garbage collection process cycles.

Next, the predictable cycle may be divided into sections at step 520. The number of sections may be chosen to provide several data points within the cycle. The data points must provide enough information for the garbage collection cycle memory usage to be compared to one or more object memory usage. In some instances, the interval may be broken up into 10 or more sections.

A data dump may be performed for each section of the interval at step 530. The data dump may be performed at the end of each section and may include information such as the data usage of the particular object at that time, the number of objects instantiated at that time for that object type, and other data. Object counts and size reached on our determined from the data dump at step 540

Figure 6:
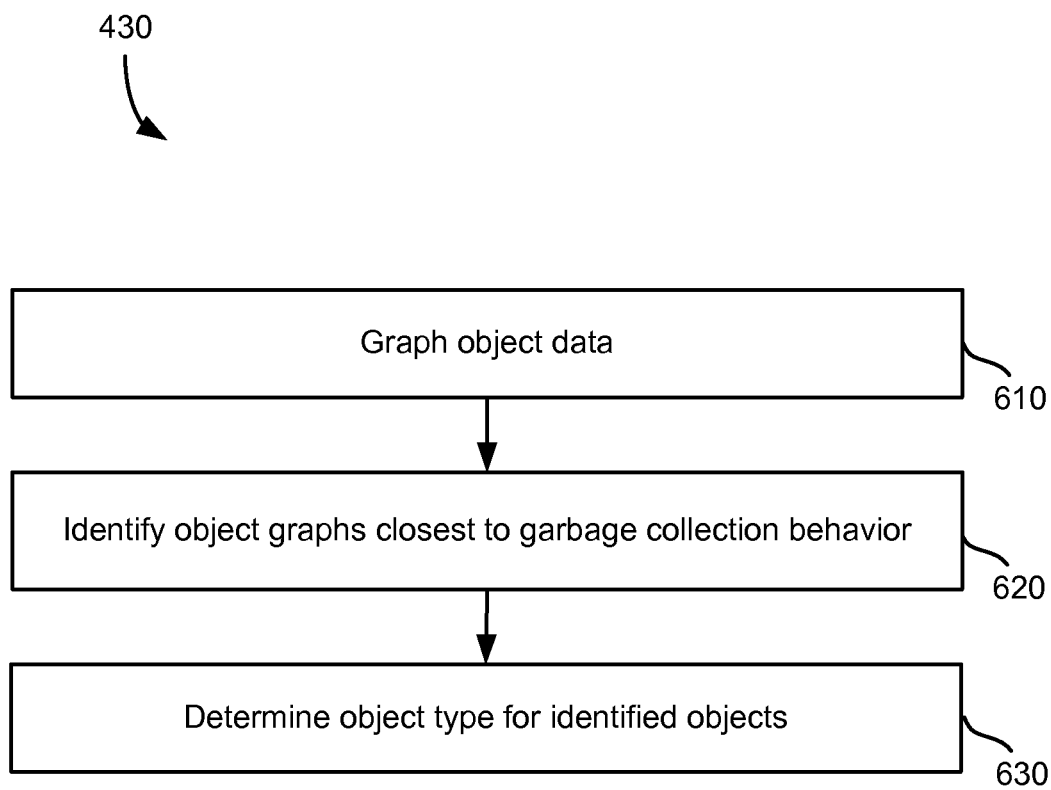
FIG. 6 illustrates a method for identifying suspicious objects.

FIG. 6 illustrates a method for identifying suspicious objects. Object data is graphed at step 620. The object data may include memory usage or and the number of objects the state instantiated. When the memory usage for a particular object is known, the object memory usage may be compared to the garbage collection process for each object handled by the process during the particular interval. Object memory usage data that most closely resembles the garbage collection memory usage (identified at step 620) is selected at step 620. The object memory usage data closest to the garbage collection memory usage may be identified by any of a number of processes, such as for example a standard deviation process. For the objects having graphs closest to the garbage collection behavior, an object type is determined for those identified objects at step 630.

Figure 7:
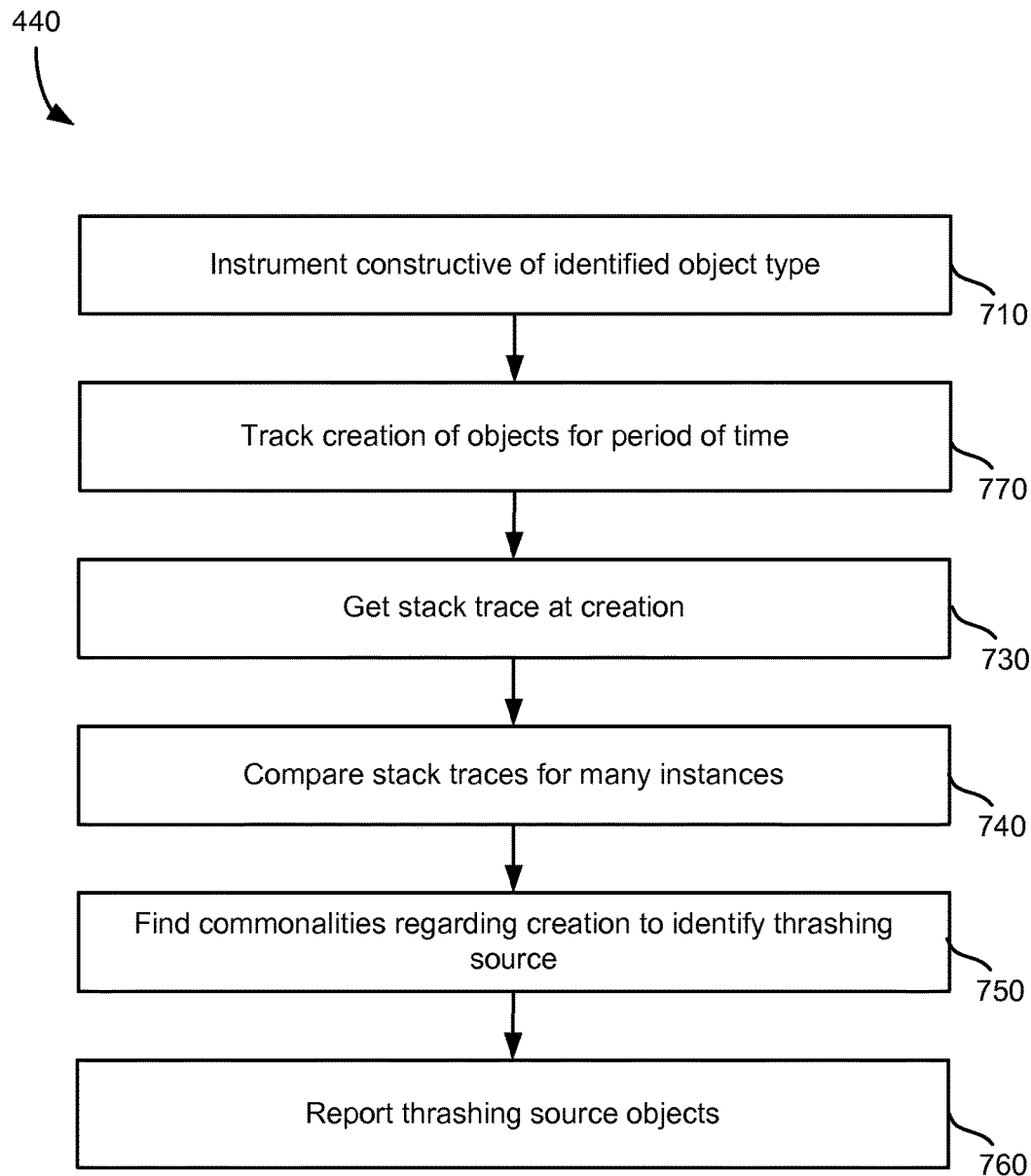
FIG. 7 illustrates a method for reporting thrashing.

FIG. 7 illustrates a method for reporting thrashing information. The method of FIG. 7 provides more detail for step 440 of the method of FIG. 4. The constructives of the identified object type identified at step 630 is instrumented at step 710. Instrumentation allows the present technology to monitor the creations of the identified object types. The creation of those objects is tracked for a period of time at step 770. A stack trace is obtained at the creation of the objects at step 730. The stack traces may then be compared for many instances of the objects at step 740. Commonalities may be determined regarding creation of the objects to identify the thrashing source at step 750. For example, if a particular object a is causing the garbage collection thrashing, and 85% of the object a creation is initiated from a particular method, that method creating most of the object instances may be identified as the source of the garbage collection thrashing. The objects causing the garbage collection thrashing and their sources are reported at step 760.

Figure 8:
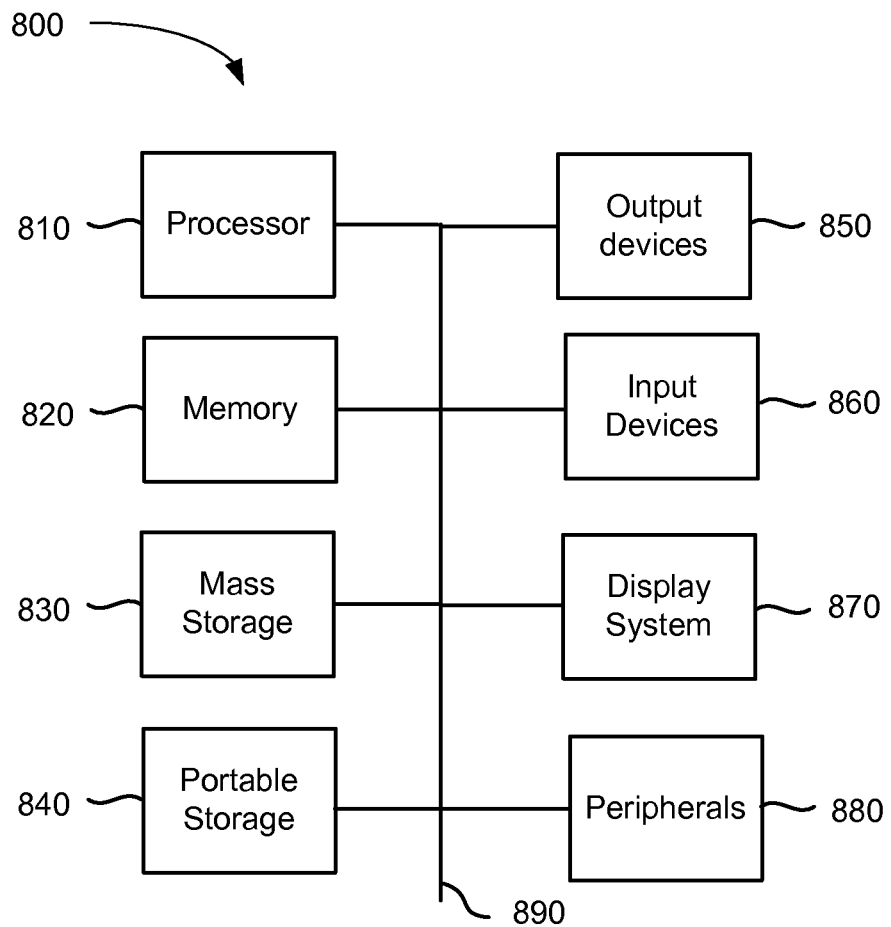
FIG. 8 provides a block diagram for a computing environment for use with the present technology.

FIG. 8 is a block diagram of an exemplary computing system for implementing the present technology. System 800 of FIG. 8 may be implemented in the contexts of the likes of client computer 85, servers 130, 140, and 150, controller 190 and client device 192. The computing system 800 of FIG. 8 includes one or more processors 810 and memory 820. Main memory 820 stores, in part, instructions and data for execution by processor 810. Main memory 820 can store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. However, the components may be connected through one or more data transport means. For example, processor unit 810 and main memory 820 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 can store the system software for implementing embodiments of the present invention for purposes of loading that software into main memory 820.

Portable storage device 840 operates in conjunction with a portable non-volatile storage medium, such as a floppy disk, compact disk or Digital video disc, to input and output data and code to and from the computer system 800 of FIG. 8. The system software for implementing embodiments of the present invention may be stored on such a portable medium and input to the computer system 800 via the portable storage device 840.

Input devices 860 provide a portion of a user interface. Input devices 860 may include an alpha-numeric keypad, such as a keyboard, for inputting alpha-numeric and other information, or a pointing device, such as a mouse, a trackball, stylus, or cursor direction keys. Additionally, the system 800 as shown in FIG. 8 includes output devices 850. Examples of suitable output devices include speakers, printers, network interfaces, and monitors.

Display system 870 may include a liquid crystal display (LCD) or other suitable display device. Display system 870 receives textual and graphical information, and processes the information for output to the display device.

Peripherals 880 may include any type of computer support device to add additional functionality to the computer system. For example, peripheral device(s) 880 may include a modem or a router.

The components contained in the computer system 800 of FIG. 8 are those typically found in computer systems that may be suitable for use with embodiments of the present invention and are intended to represent a broad category of such computer components that are well known in the art. Thus, the computer system 800 of FIG. 8 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for monitoring a garbage collection process in a business transaction over a computer network, comprising:

monitoring, by an agent on a server, the garbage collection process to identify a source of a garbage thrashing in the garbage collection process, the garbage collection process executed in association with one or more business transaction applications executing on the server;

determining, by the agent, a memory usage associated with the garbage collection process;

collecting, by the agent, a plurality of data objects handled by the garbage collection process;

graphing, by the agent, the plurality of data objects handled by the garbage collection process into a memory usage versus time graph, wherein the graph is divided into garbage collection time intervals;

determining, by the agent, a memory usage associated with each of the collected data objects handled by the garbage collection process during each of the garbage collection time intervals based on the graph of the plurality of data objects handled by the garbage collection process;

comparing, by the agent, graphically the memory usage of each of the collected data objects to the memory usage of the garbage collection process by comparing one or more stack traces obtained at a time of creation of the collected data objects to identify one or more commonalities regarding the creation of the collected data objects to identify the source of the garbage trashing;

identifying, by the agent, a suspicious sub-set of the collected data objects that most closely resemble the memory usage of the garbage collection process, wherein the suspicious sub-set of the collected data objects is the source of the garbage thrashing in the garbage collection process; and reporting, by the agent, the sub-set of identified data objects as the source of the garbage thrashing in the garbage collection process.

2. The method of claim 1, wherein monitoring the garbage collection processing includes:

identifying, by the agent, a data dump at a plurality of times during a garbage collection cycle.

3. The method of claim 1, wherein collecting a plurality of data objects includes determining, by the agent, object counts and object size at a plurality of times during each of the garbage collection time intervals, wherein the each of the garbage collection time intervals is a garbage collection cycle.

4. The method of claim 1, wherein monitoring the garbage collection process includes identifying, by the agent, a predictable cycle for the garbage collection process after the garbage collection process has been monitored for a plurality of garbage collection cycles, wherein the predicted cycle is determined based on an average time a garbage collection process takes to complete.

5. The method of claim 1, further comprising:

determining, by the agent, an object type for each data object in the sub-set of data objects.

6. The method of claim 5, further comprising: in response to identifying the sub-set of data objects, tracking, by the agent, creation of each object type within a sub-set of the collected data objects.

7. The method of claim 6, wherein the creation of each object type is tracked by instrumenting the agent to monitor and identify commonalities between the creation of each object type.

8. The method of claim 7, wherein the commonality is determined as a source of the garbage thrashing in the sub-set of data objects.

9. The method of claim 8, wherein the source is determined from stack trace data associated with each instance of a particular data object within the sub-set of data objects.

10. A non-transitory computer readable storage medium having embodied thereon a program, the program being executable by a processor to perform a method for monitoring a garbage collection process in a business transaction over a computer network, the method comprising:

monitoring, as an agent on a server, the garbage collection process to identify a source of a garbage thrashing in the garbage collection process, wherein the garbage collection process is executed in association with one or more business transaction applications executing on the server;

determining, as the agent, a memory usage associated with the garbage collection process;

collecting, as the agent, a plurality of data objects handled by the garbage collection process;

graphing, as the agent, the plurality of data objects handled by the garbage collection process into a memory usage versus time graph, wherein the graph is divided into garbage collection time intervals;

determining, as the agent, a memory usage associated with each of the collected data objects handled by the garbage collection process during each of the garbage collection time intervals based on the graph of the plurality of data objects handled by the garbage collection process;

comparing, as the agent, graphically the memory usage of each of the collected data objects to the memory usage of the garbage collection process by comparing stack traces obtained at a time of creation of the collected data objects to identify one or more commonalities regarding the creation of the collected data objects to identify the source of the garbage trashing;

identifying, as the agent, a suspicious sub-set of the collected data objects that most closely resemble the memory usage of the garbage collection process, wherein the suspicious sub-set of the collected data objects is the source of the garbage thrashing in the garbage collection process; and reporting, as the agent, the sub-set of identified data objects as the source of the garbage thrashing in the garbage collection process.

11. The non-transitory computer readable storage medium of claim 10, wherein monitoring the garbage collection processing includes:

identifying, by the agent, a data dump at a plurality of times during a garbage collection cycle.

12. The non-transitory computer readable storage medium of claim 10, wherein collecting a plurality of data objects includes determining, by the agent, object counts and object size at a plurality of times each of the garbage collection time intervals, wherein each of the garbage collection time intervals is a garbage collection cycle.

13. The non-transitory computer readable storage medium of claim 10, wherein monitoring the garbage collection process includes identifying, as the agent, a predictable cycle for the garbage collection process after the garbage collection process has been monitored for a plurality of garbage collection cycles, wherein the predicted cycle is determined based on an average time a garbage collection process takes to complete.

14. The non-transitory computer readable storage medium of claim 10, the method further comprising:

determining, as the agent, an object type for each data object in the sub-set of data objects.

15. The non-transitory computer readable storage medium of claim 14, the method further comprising: in response to identifying the sub-set of data objects, tracking, by the agent, creation of each object type within a sub-set of the collected data objects.

16. The non-transitory computer readable storage medium of claim 15, wherein the creation of each object type is tracked by instrumenting the agent to monitor and identify commonalities between the creation of each object type.

17. The non-transitory computer readable storage medium of claim 16, wherein the commonality is determined as a source of the garbage thrashing in the sub-set of data objects.

18. The non-transitory computer readable storage medium of claim 17, wherein the source is determined from stack trace data associated with each instance of a particular data object within the sub-set of data objects.

19. A system for monitoring a garbage collection process in a business transaction over a computer network, comprising:

a server including a memory and a processor; and an agent stored in the memory and executed by the processor, wherein the agent is configured to:

monitor the garbage collection process to identify a source of a garbage thrashing in the garbage collection process, the garbage collection process executed in association with one or more business transaction applications executing on the server;

determine a memory usage associated with the garbage collection process;

collect a plurality of data objects handled by the garbage collection process;

graph the plurality of data objects handled by the garbage collection process into a memory usage versus time graph, wherein the graph is divided into garbage collection time intervals;

determine a memory usage associated with each of the collected data objects handled by the garbage collection process during each of the garbage collection time intervals based on the graph of the plurality of data objects handled by the garbage collection process;

compare graphically the memory usage of each of the collected data objects to the memory usage of the garbage collection process by comparing stack traces obtained at a time of creation of the collected data objects to identify one or more commonalities regarding the creation of the collected data objects to identify the source of the garbage trashing;

identify a suspicious sub-set of the collected data objects that most closely resemble the memory usage of the garbage collection process, wherein the suspicious sub-set of the collected data objects is the source of the garbage thrashing in the garbage collection process; and report the sub-set of identified data objects as the source of the garbage thrashing in the garbage collection process.

20. The system of claim 19, wherein while monitoring the garbage collection processing, the agent is further configured to:

identify a data dump at a plurality of times during a garbage collection cycle.

21. The system of claim 19, wherein while collecting a plurality of data objects, the agent is further configured to determine object counts and object size at a plurality of times each of the garbage collection time intervals, wherein each of the garbage collection time intervals is a garbage collection cycle.

22. The system of claim 19, wherein while monitoring the garbage collection process, the agent is further configured to: identify a predictable cycle for the garbage collection process after the garbage collection process has been monitored for a plurality of garbage collection cycles, wherein the predicted cycle is determined based on an average time a garbage collection process takes to complete.

23. The system of claim 19, wherein the agent is further configured to:

determine an object type for each data object in the sub-set of data objects.

24. The system of claim 23, wherein the agent is further configured to: in response to identifying the sub-set of data objects, track creation of each object type within a sub-set of the collected data objects.

25. The system of claim 24, wherein the creation of each object type is tracked by instrumenting the agent to monitor comparing commonalities between the creation of each object type.

26. The system of claim 25, wherein the commonality is determined as a source of the garbage thrashing in the sub-set of data objects.

27. The system of claim 26, wherein the source is determined from stack trace data associated with each instance of a particular data object within the sub-set of data objects.

* * * * *